(12) United States Patent
Sayilgan

(10) Patent No.: US 8,561,266 B2
(45) Date of Patent: Oct. 22, 2013

(54) HOLDER ARRANGEMENT FOR AN AIRCRAFT OR A SPACECRAFT AND AN AIRCRAFT OR A SPACECRAFT

(75) Inventor: Cihangir Sayilgan, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 475 days.

(21) Appl. No.: 12/605,645

(22) Filed: Oct. 26, 2009

(65) Prior Publication Data

US 2010/0107375 A1 May 6, 2010

Related U.S. Application Data

(60) Provisional application No. 61/111,187, filed on Nov. 4, 2008.

(51) Int. Cl.
*F16B 2/00* (2006.01)

(52) U.S. Cl.
USPC .............................. 24/455; 244/131; 248/73

(58) Field of Classification Search
USPC ............. 248/68.1, 70, 58, 65, 72, 73, 223.41, 248/228.5, 231.61; 244/131; 24/455
See application file for complete search history.

(56) References Cited

U.S. PATENT DOCUMENTS

| | | | | |
|---|---|---|---|---|
| 3,294,349 A | * | 12/1966 | Mathes | 248/68.1 |
| 5,024,405 A | * | 6/1991 | McGuire | 248/73 |
| 5,050,824 A | * | 9/1991 | Hubbard | 248/57 |
| 6,581,884 B1 | * | 6/2003 | Gretz | 248/74.1 |
| 7,549,613 B1 | * | 6/2009 | Ismert et al. | 248/73 |
| 2005/0242245 A1 | * | 11/2005 | Balderama et al. | 248/65 |
| 2009/0014586 A1 | | 1/2009 | Gross et al. | |

FOREIGN PATENT DOCUMENTS

| | | | |
|---|---|---|---|
| CH | 439 880 | | 7/1967 |
| DE | 4208493 A1 | * | 9/1993 |
| DE | 10 2007 032 235 | | 1/2009 |
| EP | 561107 A1 | * | 9/1993 |
| FR | 2 864 940 | | 7/2005 |

OTHER PUBLICATIONS

German Office Action for Application No. 10 2008 043 448.5 dated Mar. 18, 2013.

* cited by examiner

*Primary Examiner* — James Brittain
(74) *Attorney, Agent, or Firm* — Jenkins, Wilson, Taylor & Hunt, P.A.

(57) ABSTRACT

In a holder arrangement of an aircraft or spacecraft comprising a structural member, a holder comprising at least one lower part and at least one upper part is provided, and these are formed so as to be able to be clamped together to be attached with a non-positive fit to a fastening portion of the structural member. The fastening portion can be clamped between the lower part and the upper part. The holder arrangement is characterised by at least one fixing strip which can be connected to the fastening portion of the structural member in the longitudinal direction thereof and which comprises a fixing profile for fixing the holder to the structural member in the longitudinal direction of the structural member with a positive fit. An aircraft or spacecraft has at least one holder arrangement of this type.

8 Claims, 5 Drawing Sheets

HOLDER ARRANGEMENT FOR AN AIRCRAFT OR A SPACECRAFT AND AN AIRCRAFT OR A SPACECRAFT

CROSS-REFERENCE TO RELATED APPLICATIONS

This application claims the benefit of U.S. Provisional Application No. 61/111,187, filed Nov. 4, 2008, the entire disclosure of which is herein incorporated by reference.

FIELD OF THE INVENTION

The present invention relates to a holder arrangement for an aircraft or a spacecraft and to an aircraft or a spacecraft.

Holder arrangements of this type are used in the form of different holder systems in aircraft or spacecraft, in which the different holders are fastened to structural members such as frames, stringers, transverse floor beams, floor support systems, flat profile parts and the like in order to act as a holder for various installation elements in the aircraft or spacecraft in question. These installation elements may be of different types, such as cable channels for electrical lines, lines for liquids, etc.

The structural members are generally produced from metal and connected using rivets and bolts, but composite fibre components are also widely used in aircraft construction for skin panels and the reinforcement thereof by stringers for example. They are produced for example by vacuum infusion to introduce a matrix, for example an epoxy resin, into fibre semi-finished products and a subsequent curing process.

Previous holder systems fasten to structural members in such a way that it is necessary for there to be fastening holes in the structural members, for example for rivet and/or screw connections. This is a drawback, firstly because the presence of holes means that the structural members are weakened and secondly because holes require additional work during the manufacturing process with appropriate tools, for example drills, deburring tools, and screwing or riveting tools. Additional time is also required for any appropriate cleaning processes.

Solutions which have dispensed with fastening holes have been proposed. For example, DE 42 08 494 C1 discloses a holder for fastening insulating material in order to provide heat insulation for an aircraft cabin. The holder is formed as a two-part clip which can be placed on a stringer. This holder comprises a lower part with a depression for the stringer and a closure part which can be locked in place in the form of an upper part. The upper part has a curve facing the stringer and an integrally formed compensating spring, the upper part being able to be clipped onto a retaining pin connected to the lower part.

This holder is less suited to holding installation elements which are heavier than insulating materials since the clamping force exerted thereby must be adjusted accordingly and this requires a greater amount of space.

SUMMARY OF THE INVENTION

It is therefore the object of the present invention to provide an improved holder arrangement which no longer exhibits, or considerably reduces the above drawbacks and provides further advantages.

This object is achieved according to the invention by a holder arrangement with the features as disclosed herein and an aircraft or spacecraft with the features as disclosed herein.

A holder arrangement for an aircraft or spacecraft comprising a structural member and a holder is accordingly provided. The holder comprises at least one lower part and at least one upper part which are formed so as to be able to lock together to provide a non-positive attachment to a fastening portion of the structural member. The fastening portion can be clamped between the at least one lower part and the at least one upper part. The holder arrangement is characterised in that at least one fixing strip, which can be connected to the fastening portion of the structural member in the longitudinal direction thereof, is provided with a fixing profile for fixing the holder to the structural member in the longitudinal direction of the structural member with a positive fit.

One of the ideas on which the invention is based is that the holder arrangement, which can be clamped to a structural member, has a securing means, in the form of a fixing strip or fixing profile, against slippage in the longitudinal direction of the structural member, the position of the holder arrangement being freely selectable.

The present invention thus has, inter alia, the advantages over the approaches mentioned at the outset that the holder arrangement is secured against slippage by the fixing strip and is also suitable for holding installation elements of a greater weight.

Furthermore, the structural members are not weakened by fastening holes and the costly and disruptive drilling process can be dispensed with, in particular in the case of fibre polymer composite components, such as CFRP (carbon fibre reinforced plastics material).

A further advantage is that the assembly of the holder is considerably simplified in that it is merely clamped and placed. This simple handling procedure also makes it possible to pre-fit systems which are to be subsequently installed in an aircraft or spacecraft.

The holders can be attached to structural members formed from metal or fibre polymer composites. They are also suitable as what are known as CFRP-suitable designs as they can be produced from thermoplastic polymers, polyamides, etc.

The term "fastening portion" is preferably to be understood as a portion of a structural member located at the upper free end of the structural member, the other end of which is fastened to a shell component for example. The fastening portion may be folded, bent, L-shaped or of a different shape. It is also possible for a structural member to be a flat profile with a straight fastening portion.

In one embodiment, the fixing strip can be connected to the fastening portion of the structural member with a suitable adhesive. It is alternatively also possible to attach the fixing strip with a suitable casting compound which may be an epoxy resin for example. In the case of composite fibre components, it is possible to fasten the fixing strip with resin.

In an alternative embodiment, the fixing strip is formed in one piece with the fixing profile on the fastening portion in a casting process. This can be achieved for example using a castable resin, in particular if the structural member is formed from CFRP or the like. For structural members made of metal, the casting process could be carried out using a multi-component resin suitable for the corresponding metal.

The fixing profile can also be integrated with the fixing strip during manufacture of the structural member from a composite fibre material, for example by an integral casting process. It is also possible for the fixing profile to be produced by way of a filling process using resin. It is further conceivable for the fixing profile required to be subsequently cast on at locations provided for this purpose using a mould.

The fixing profile is preferably formed as a toothed profile. Other shapes, such as a serrated profile or the like, are of course also possible.

In one embodiment, it is provided that at least one upper part has an upper part seat comprising a retaining side plate and a supporting side plate in order to encompass the fastening portion at least in part, the upper part seat being basically adapted to the fastening portion, and the retaining side plate being provided for contacting one side of the fastening portion. In this way, in the case of an L-shaped fastening portion for example, the fixing strip or fixing profile can be attached to the fastening profile, said fastening profile, together with the fixing strip or fixing profile, being surrounded by the upper part seat. The upper part seat is preferably provided with at least one fixing rib which corresponds to the fixing profile. Engagement between the at least one fixing rib and the fixing profile enables the holder to be fixed with a positive fit in the longitudinal direction of the structural member, since the fixing profile is rigidly connected to the structural member. The fixing strip or fixing profile thus ensures that the holder cannot slide along the structural member in the longitudinal direction thereof.

For the purposes of clamping the holder to the structural member, it is provided that the at least one lower part has at least one clamping side plate comprising a contact profile for contacting the side of the fastening portion opposite the upper part seat and the supporting side plate, and comprising a contact profile for contacting the side of the fastening portion opposite the retaining side plate. By simply pressing the upper part and lower part together, it is thus possible to clamp the upper and lower parts in such a way that the fastening portion of the structural member is held by clamping in a non-positive manner between the upper and lower parts.

In one embodiment, clamping of the upper and lower parts is achieved in that the supporting side plate of the at least one upper part forms, together with a locking side plate, a wedge which is provided to cooperate with a corresponding clamping seat of the at least one lower part, the clamping seat being formed of a locking incline and the clamping side plate. In this case, the locking incline of the at least one lower part and the locking side plate of the at least one upper part are formed with corresponding locking members.

This enables said parts to be locked or latched when the upper and lower parts are pressed together and this locked or latched position can be secured with screws or clip-on or snap-on connections for example.

The wedge formed in this way has a clamping effect, and in one embodiment a contact profile of the clamping side plate presses against one side of the fastening portion, the other side of which is acted upon by the upper part seat, the supporting side plate and the retaining side plate with a force produced by the clamping effect and the resilience of the holder.

In the case of a flat profile, the upper side for example of said profile is provided with the fixing strip or fixing profile. The upper part seat engages via the fixing ribs thereof with the fixing profile, one side of the retaining side plate contacting the fastening portion. The other side of the retaining side plate contacts the inner side of the supporting side plate on the one hand via the contact profile, and contacts the fastening portion on the other hand via a further opposite contact profile. By pressing the upper and lower parts together, the clamping side plate of the lower part is pressed between the supporting side plate of the upper part and the fastening portion, the retaining side plate of upper part being pulled from the other side against the fastening portion. This makes it possible to advantageously extend the field of application of the holder arrangement according to the invention.

In a further preferred embodiment, the at least one lower part and/or the at least one upper part are provided with at least one holder head socket for a holder head. The holder head fastens and holds different installation elements and can be adapted to these accordingly, the holder arrangement being able to remain unchanged. The holder head can be easily inserted into the holder head socket and locked using a catch member in a catch portion of the holder head socket. This reduces the number of holder components and enables a modular design with a low number of parts and simple assembly without tools to be achieved.

The position of the holder arrangement can basically be freely selected and is only limited by an incline in the fixing profile. This thus provides a high degree of flexibility.

The holder arrangement is prevented from sliding along the structural member by the fixing strip and the fixing profile so larger installation element loads (and of course also smaller loads) can be held without it being necessary to increase the clamping force of the holder arrangement against sliding.

Any cutting processes for the structural member can be dispensed with entirely, thus entirely avoiding weakening the structural members. This means that the associated processes, such as deburring and cleaning, are no longer necessary. Furthermore, luting of drill holes can also be dispensed with since these holes are no longer present.

An aircraft or spacecraft comprises at least one holder arrangement described above.

BRIEF DESCRIPTION OF THE DRAWINGS

The invention is described in greater detail below by way of embodiments with reference to the appended figures of the drawings, in which.

DESCRIPTION OF EXEMPLARY EMBODIMENTS

Figure 1:
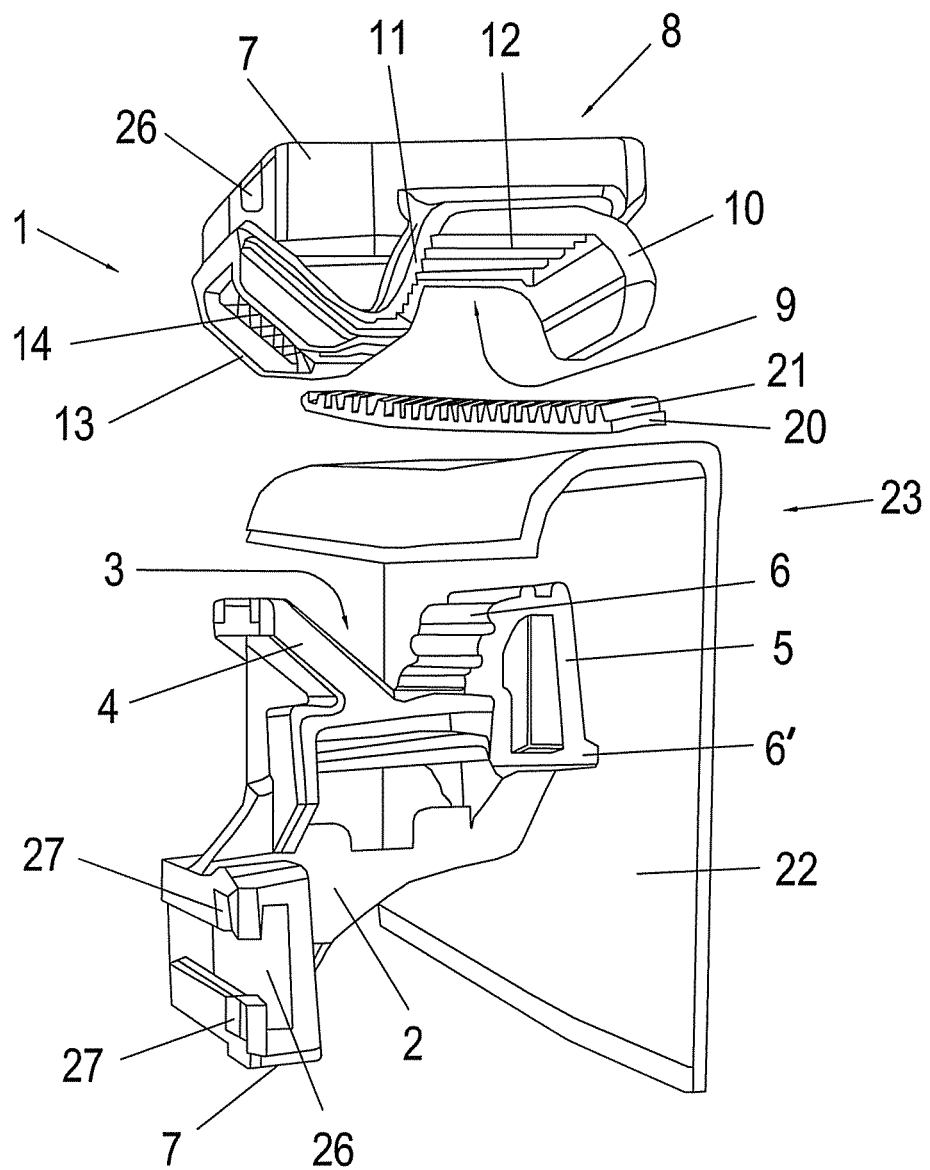
FIG. 1 is a perspective exploded view of an embodiment of a holder arrangement according to the invention.

In the figures, like reference numerals refer to like components or components with similar functions, unless otherwise stated. Furthermore, coordinate systems x, y, z are given in the figures for better orientation.

FIG. 1 shows a perspective exploded view of an embodiment of a holder arrangement according to the invention.

The holder arrangement is composed of a structural member 22, a holder 1 comprising a lower part 2, an upper part 8 and a fixing strip 20. In this case, the structural member 22 is a frame with a straight web which is attached (not shown) to a shell component of an aircraft or spacecraft (not shown) and is produced from a fibre polymer composite, such as CFRP for example. In its upper region, the structural member 22 has a fastening region 23 which is initially bent at right angles from the web and is then bent slightly with a radius so as to point obliquely downwards.

The lower part 2 of the holder 1 has a basic body extending at right angles to the structural member 22, and the upper side of said lower part supports a locking incline 4 and a clamping side plate 5, which between them form a V-shaped clamping seat 3 is formed. The lower sides of the locking incline 4 and the clamping side plate 5 are connected by a transverse support belonging to the basic body of the lower part 2. To the left of the V-shaped or wedge-shaped clamping seat 3 (in FIG. 1), the clamping side plate 5 has a rounded cross-section which basically corresponds to the small portion of the fastening portion bent downwards in an inclined manner. The surface of the clamping side plate 5 facing the clamping seat 3 is provided with ribs which extend parallel to the structural member 22, have a semi-circular cross-section and form a contact profile 6. Facing the web of the structural member 22, the clamping side plate 5 has a straight face which extends obliquely downwards from above and has a contact profile 6' with a semi-circular cross-section on the lower side thereof. The contact profile 6' extends parallel to the structural member 22.

A holder head socket 7 is attached to the outer side of the lower part 2 and has a socket portion 26 and catch portions 27, the function of which will be explained more comprehensively below.

The basic body, locking incline 4, clamping side plate 5 and holder head socket 7 of the lower part 2 are in this case connected with one another and reinforced by reinforcing webs. The lower part 2 may for example be manufactured from plastics material, for example a thermoplastic polymer, polyamide.

The upper part 8 is provided with a basic body which is also arranged at right angles to the structural member 22 and has a downwardly-directed upper part seat 9 which is formed and delimited in FIG. 1 by a downwardly-directed retaining side plate 10 on the right-hand side and by a supporting side plate 11 which extends obliquely downwards from above on the left-hand side. The retaining side plate 10 and supporting side plate 11 extend in the longitudinal direction of the structural member 22. At its lower side, the supporting side plate 11 transitions via a connecting web into a locking plate 13 which extends obliquely upwards to the left and the upper end of which is attached to the basic body of the upper part 8. The basic body is connected to a holder head socket 7 which in this case extends parallel to the basic body of the upper part 8.

The upper part seat 9 has a cross-section which in this example basically corresponds to the cross-section of the fastening portion 23 of the structural member 22. The inner upper side of the upper part seat 9 has fixing ribs 12 which correspond to a fixing profile 21 of a fixing strip 20. The fixing strip 20 is fastened on the fastening portion 23 in the longitudinal direction of the structural member 22, said strip being arranged between the fastening portion 23 and the upper part 8. The function thereof will be explained more comprehensively below.

The supporting side plate 11 and the locking side plate 13 form a wedge which is V-shaped and corresponds to the V-shaped or wedge-shaped clamping seat 3 of the lower part 2. In this example, the downwardly-extending sides of the locking side plate 13 have guide webs which correspond to guide grooves in the locking incline 4 of the lower part 2. In addition, locking members 14 which extend parallel to the basic body of the upper part 8 and correspond to locking members on the inner side of the locking incline 4 (not shown but easy to visualise), are attached to the outer side of the locking side plate 13.

The upper part 8 can for example be manufactured from plastics material, for example a thermoplastic polymer, polyamide.

Figure 2:
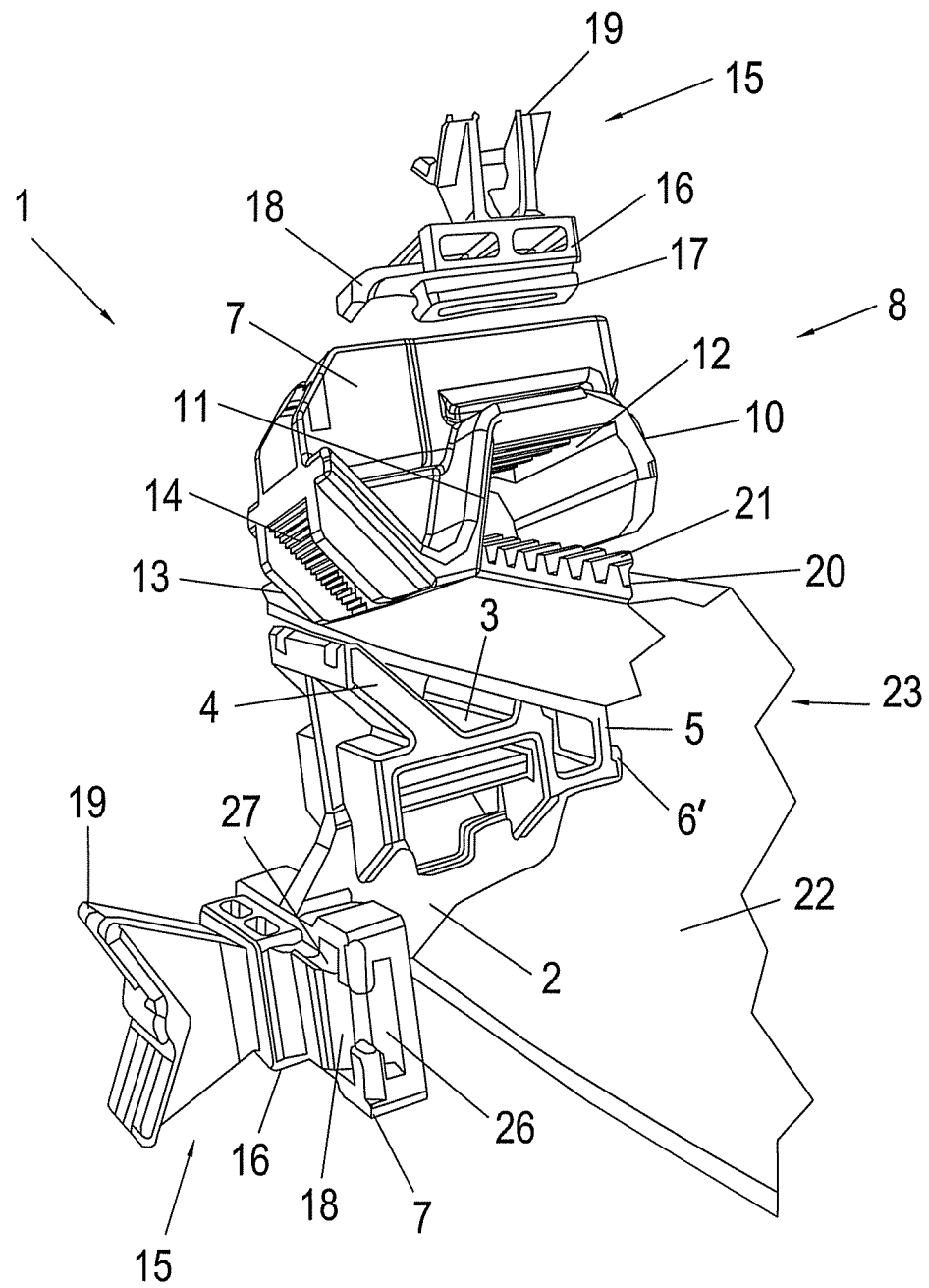
FIG. 2 is the embodiment of FIG. 1 in a position shortly before being installed.

The holder arrangement 1 is attached to the fastening portion 23 of the structural member 22 in such a way that the lower part 2 is brought under the fastening portion 23 from below by means of the clamping side plate 5, the portion of the fastening portion 23 bent obliquely downwards projecting over the contact profile 6 of the clamping side plate 5 into the clamping seat 3. This situation is shown in FIG. 2 in a perspective in accordance with FIG. 1. The fixing strip 20 is attached and rigidly connected to the fastening portion 23, for example with a suitable adhesive. Said fixing strip may also be integrated into the structural member 22 during the manufacture thereof. It would also be possible for the fixing profile 21 made of resin to be integrated with the structural member 22, for example cast integral therewith. It may also be possible to form the fixing profile 21 integrally from resin during assembly using a moulding tool. Other fastening methods are also possible.

The upper part 8 is now attached onto the fastening portion 23 in such a way that it is encompassed, the retaining side plate 10 contacting the fastening portion 23 from the outside on the right (in FIG. 2) and the fixing ribs 12 engaging with the fixing profile 21 of the fixing strip 20. At the same time, the wedge formed from the supporting side plate 11 and the locking side plate 13 is inserted into the clamping seat 3 of the lower part 2. In this way, the locking side plate 13 presses against the locking incline 4, the supporting side plate 11 simultaneously pressing against the outer side of the portion of the fasting portion 23 bent obliquely downwards, said fastening portion internally contacting the contact profile 6 of the clamping side plate 5. Pressing the upper part 8 and the lower part 2 together further causes the locking members 14 between the locking side plate 13 and the locking incline 4 to lock. This increases the clamping force between the upper part 8, fastening portion 23 and lower part 2 and produces a non-positive clamping connection. In this way, the clamping side plate 5 also contacts the fastening portion 23 of the structural member 22 via the contact profile 6'. This is shown in FIG. 3 in a further perspective illustration.

FIG. 2 also shows a holder head 15 having a basic body 16 comprising a base portion 17, a catch member 18 and retaining members 19. The holder head 15 shown in FIG. 2 has not yet been inserted into the holder head socket 7 of the upper part 8, a further holder head 19 being inserted via the base portion 17 thereof into the socket portion 26 in the holder head socket 7 of the lower part 2 and being locked in the catch portions 27 of the holder head by the catch member 18, can easily be visualised.

Figure 3:
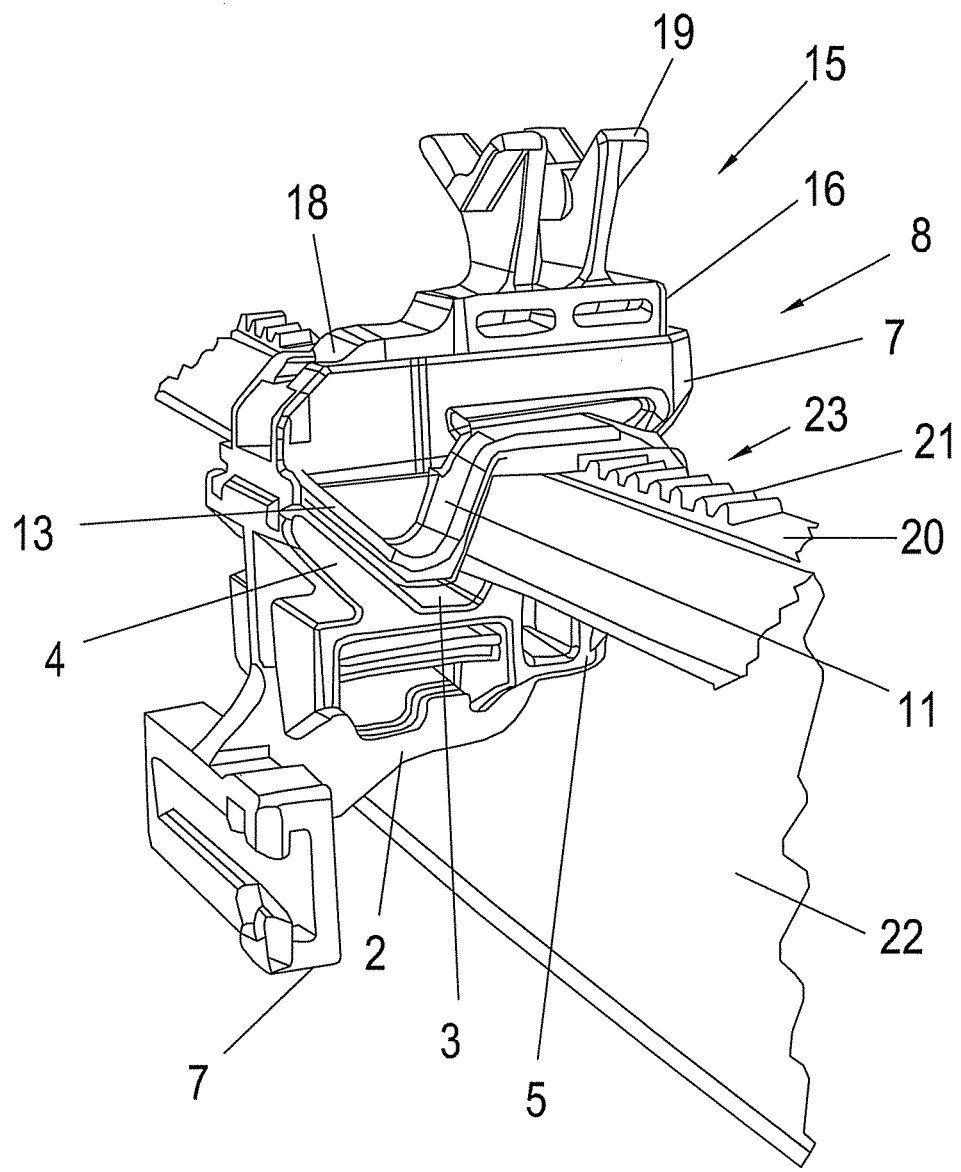
FIG. 3 is the embodiment of FIG. 1 in the installed state.

FIG. 3 shows the embodiment of FIGS. 1 and 2 in the mounted state in which the lower holder head is not inserted. The holder 1 is connected to the fastening portion 23 of the structural member 22 with a non-positive fit by the aforementioned clamping process. The engagement between the fixing ribs 12 of the upper part 8 and the fixing profile 21 of the fixing strip 20, which is rigidly connected to the structural member 20, fixes the upper part 8, and thus the holder 1, together with the lower part 2 thereof, in such a way that it is secured in the longitudinal direction of the structural member 22 and cannot slip. The lower part 2, together with the upper part 8, is locked via the clamp connection and also by the guide webs of the locking side plate 13 in guide grooves in the locking incline 4 in the longitudinal direction of the structural member 22. The upper part 8 and lower part 2 may be additionally secured by fastening means, such as screws and/or clip-on/snap-on connections.

Figure 4:
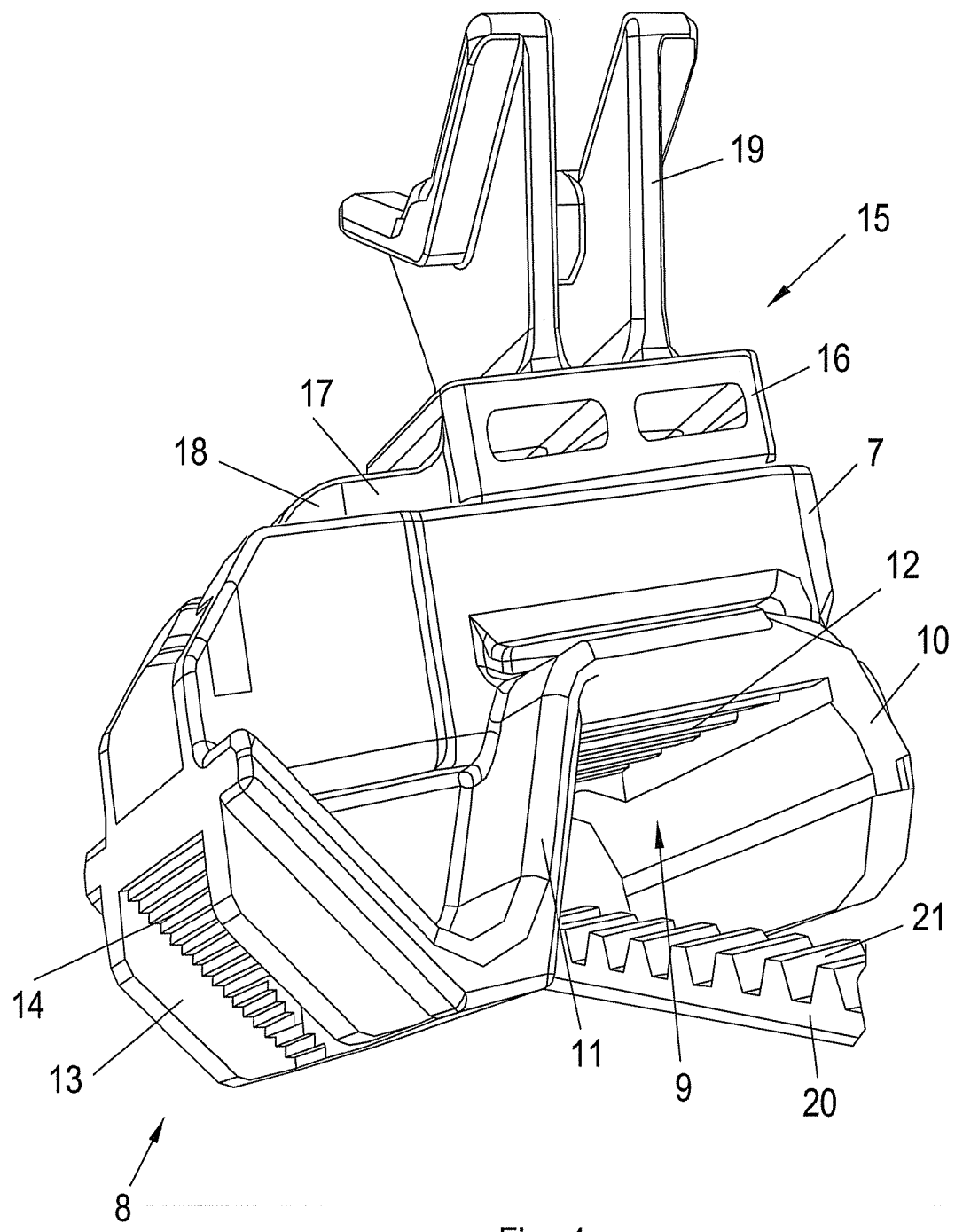
FIG. 4 is an enlarged perspective view of an upper part comprising a holder head of the holder arrangement according to the invention of FIG. 1.

FIG. 4 is an enlarged view of the upper part 8 with an attached holder head 15. The fixing ribs 12 in the upper part seat 9 encompassed by the retaining side plate 10 and supporting side plate 11 for engaging in the fixing profile 21 of the fixing strip 20 can clearly be seen. The fixing ribs 12 and the fixing profile 21 may be a toothed profile for example. The locking side plate 13 comprising the locking members 14 is provided with guide webs on both sides. The locking members 14 are formed for example as locking teeth, said locking members corresponding to the locking members (not shown) of the locking incline 4 of the lower part 2. The components of the upper part 8 are also reinforced and connected via webs, in a manner similar to the components of the lower part 2. The fixing strip 20 comprising the fixing profile 21 can be formed from plastics material but also from metal.

Figure 5:
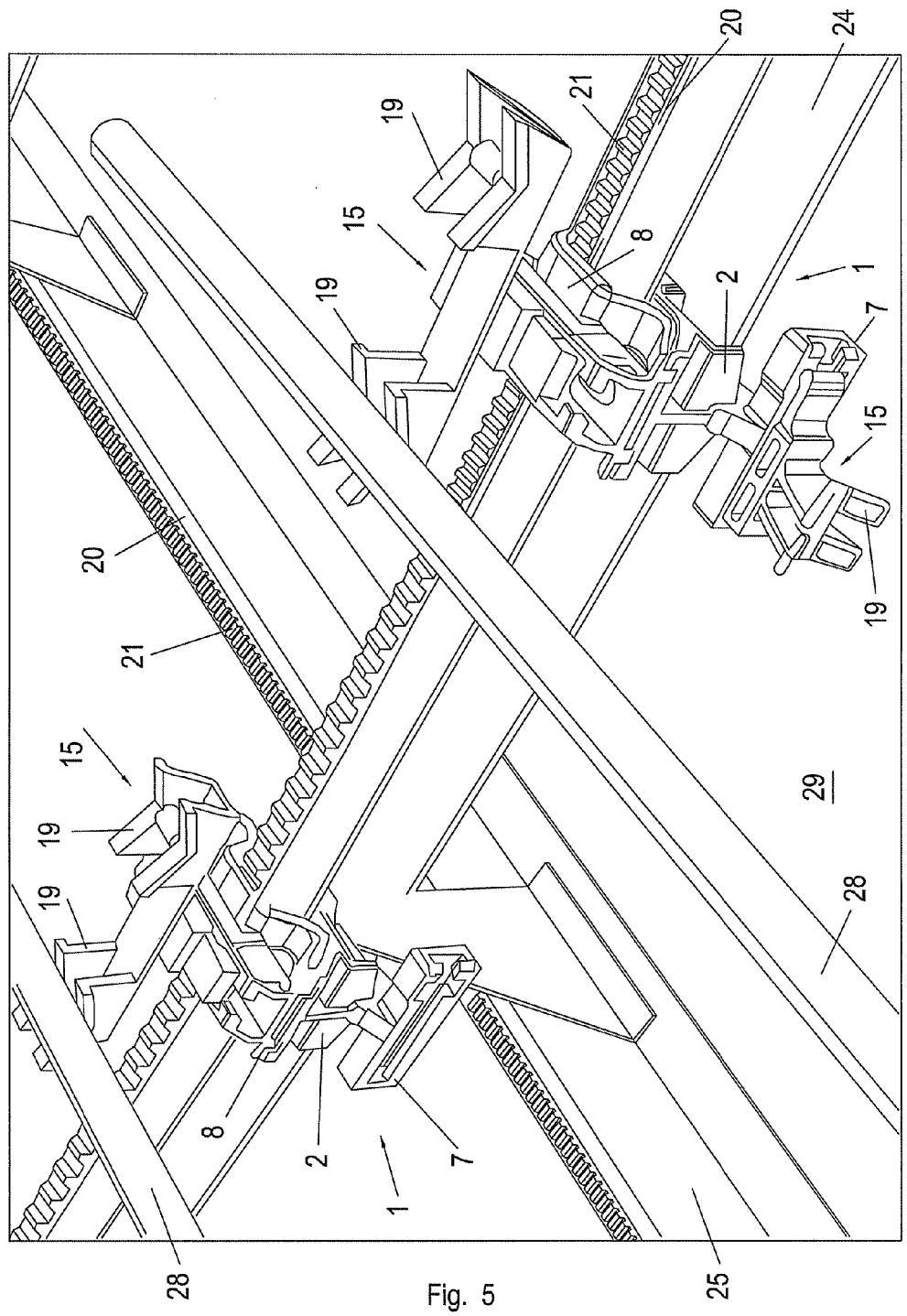
FIG. 5 is a perspective view of two holder arrangements according to the invention on a fuselage structure of an aircraft or spacecraft.

FIG. 5 is a perspective view of two holder arrangement according to the invention on a fuselage structure 29 of an aircraft or spacecraft. The fuselage structure 29 may for example be a shell component reinforced by structural members such as a frame 24 and a stringer 25. The upper sides of the frame 24 and stringer 25 have fixing profiles 21 on fixing strips 20. Two holders 1 described above are attached to the frame 24 and are secured against slipping in the longitudinal direction of the frame 24 by the fixing strip 20 comprising the fixing profile 21. In principle, the holders 1 can be attached in any position by clamping without fastening holes in the frame 24. The position is only restricted to a particular small contact spacing by the incline of the fixing profile. In this case, there are two retaining members 19 on the holder heads 15 and they support installation elements 28, for example lines for different media (electricity, liquids).

The process of attaching the holder 1 to the stringer 25, which is a flat profiled part, is described below.

The upper part seat 8 engages via the fixing ribs 12 thereof with the fixing profile 20, the retaining side plate 10 contacting one side of the fastening portion 23. On the other side, the clamping side plate 5 of the lower part 2 contacts the inner side of the supporting side plate 11 via the contact profile 6 on the one hand and contacts the fastening portion 23 via the further, opposite, contact profile 6' on the other. Pressing the upper and lower parts 8 and 2 together causes the clamping side plate 5 of the lower part 2 to be pressed between the support side plate 11 of the upper part 8 and the fastening portion 23, the retaining side plate 10 of the upper part 8 being pulled against the fastening portion 23 from the other side. This thus makes it possible to advantageously broaden the field of application of the holder arrangement according to the invention.

Although the present invention has been described in this document by way of preferred embodiments, said invention is not restricted thereto but can be combined and modified in a variety of ways.

For example, the lower part 2 and the upper part 8 may be captively interconnected between the outer ends of the locking incline 4 and the locking side plate 13 by a thin plastics material connection (for example film bearing), this connection being so flexible that it is possible to fold and press the lower part 2 and the upper part 8 together.

In a holder arrangement of an aircraft or spacecraft comprising a structural member 20, a holder 1 comprising at least one lower part 2 and at least one upper part 8 is provided, and these are formed so as to be able to be clamped together to be attached with a non-positive fit to a fastening portion 23 of the structural member 22. The fastening portion 23 can be received between the lower part 2 and the upper part 8. Furthermore, at least one fixing strip 20 which comprises a fixing profile 21 and can be connected to the fastening portion 23 of the structural member 22 in a longitudinal direction thereof is provided to fix the holder 1 with a positive fit to the structural member 22 in the longitudinal direction of the structural member 22. An aircraft or spacecraft comprises at least one holder arrangement of this type.

LIST OF REFERENCE NUMERALS 1 holder
2 lower part
3 clamping seat
4 locking incline
5 clamping side plate
6 contact profile
7 holder head socket
8 upper part
9 upper part seat
10 retaining side plate
11 supporting side plate
12 fixing rib
13 locking side plate
14 locking member
15 holder head
16 basic body
17 base portion
18 catch member
19 retaining member
20 fixing strip
21 fixing profile
22 structural member
23 fastening portion
24 frame
25 stringer
26 socket portion
27 catch portion
28 installation element
29 fuselage structure

The invention claimed is:

1. A holder arrangement of an aircraft or spacecraft, comprising:
   a structural member of an aircraft or spacecraft having a fastening portion, wherein the structural member is made of carbon fiber reinforced plastics material (CFRP);
   a holder comprising at least one lower part and at least one upper part which, for the purposes of attachment with a respectively non-positive fit to the fastening portion of the CFRP structural member, are formed so that the fastening portion can be clamped between them; and
   at least one fixing strip for connection to the fastening portion of the CFRP structural member in a longitudinal direction thereof, wherein the fixing strip has a fixing profile for fixing the holder to the CFRP structural member in the longitudinal direction of the CFRP structural member with a positive fit, and wherein the fixing strip, together with the fixing profile, is connected to the fastening portion of the CFRP structural member with a suitable adhesive or a casting material or is integrally formed in a casting process.

2. The holder arrangement according to claim 1, wherein the fixing profile is formed as a toothed profile.

3. The holder arrangement according to claim 1, wherein the at least one upper part has an upper part seat comprising a retaining side plate and a supporting side plate for encompassing the fastening portion at least in part, the upper part seat being substantially adapted to the fastening portion, and the retaining side plate being provided for contacting one side of the fastening portion.

4. The holder arrangement according to claim 3, wherein the upper part seat for encompassing the fastening portion and the fixing profile at least in part is provided with a fixing rib which corresponds to the fixing profile.

5. The holder arrangement according to claim 3, wherein the at least one lower part has at least one clamping side plate comprising a contact profile for contacting the side of the fastening portion opposite the upper part seat and the supporting side plate, or for contacting the supporting side plate, and comprising a contact profile for contacting the side of the fastening portion opposite the retaining side plate.

6. The holder arrangement according to claim 3, wherein the supporting side plate of the at least one upper part and a locking side plate form a wedge which is provided to cooperate with a corresponding clamping seat of the at least one lower part, the clamping seat being formed from a locking incline and the clamping side plate, the locking incline and the locking side plate being formed with corresponding locking members.

7. The holder arrangement according to claim 1, wherein the at least one lower part or the at least one upper part are provided with at least one holder head socket for a holder head.

8. An aircraft or spacecraft comprising at least one holder arrangement according to claim 1.

\* \* \* \* \*